(12) United States Patent
Zhang et al.

(10) Patent No.: US 11,549,670 B2
(45) Date of Patent: Jan. 10, 2023

(54) PIN-TYPE CONNECTION APPARATUS

(71) Applicant: SHENZHEN GLOSHINE TECHNOLOGY CO., LTD., Guangdong (CN)

(72) Inventors: Xianfeng Zhang, Guangdong (CN); Yongjun Zhang, Guangdong (CN); Guoqiang Li, Guangdong (CN); Jiawei Cao, Guangdong (CN)

(73) Assignee: SHENZHEN GLOSHINE TECHNOLOGY CO., LTD., Shenzhen (CN)

( * ) Notice: Subject to any disclaimer, the term of this patent is extended or adjusted under 35 U.S.C. 154(b) by 404 days.

(21) Appl. No.: 16/632,866

(22) PCT Filed: Oct. 16, 2019

(86) PCT No.: PCT/CN2019/111426
§ 371 (c)(1),
(2) Date: Jan. 21, 2020

(87) PCT Pub. No.: WO2020/134384
PCT Pub. Date: Jul. 2, 2020

(65) Prior Publication Data
US 2021/0222859 A1     Jul. 22, 2021

(30) Foreign Application Priority Data
Dec. 24, 2018   (CN) .......................... 201811582367.3

(51) Int. Cl.
*F21V 21/08*     (2006.01)
*F21V 21/088*    (2006.01)
(Continued)

(52) U.S. Cl.
CPC ............ *F21V 21/088* (2013.01); *F16B 2/185* (2013.01); *G09F 9/30* (2013.01); *G09F 9/33* (2013.01); *F21Y 2115/10* (2016.08)

(58) Field of Classification Search
CPC ...... F21V 21/088; F16B 2/185; F16B 21/165; F16B 35/005; F16B 7/0413; F16B 21/02;
(Continued)

(56) References Cited

U.S. PATENT DOCUMENTS 3,517,904 A * 6/1970 Verchain ............ F16M 11/2085
                                                248/324
8,757,564 B2 * 6/2014 Huang .................. F16M 11/18
                                                396/419
(Continued)

FOREIGN PATENT DOCUMENTS

CN    205559457 U    9/2016
CN    107578708 A    1/2018
(Continued)

OTHER PUBLICATIONS

Search report of counterpart European Patent Application No. 19831969.1 dated Aug. 1, 2022.

*Primary Examiner* — Muhammad Ijaz (57) ABSTRACT

A pin-type connection apparatus includes a first connecting seat, a second connecting seat, a connecting shaft, and a locking component, wherein a receiving hole and a locking hole on the adjacent side of the receiving hole are disposed on the second connecting seat, one end of the connecting shaft is fastened to the first connecting seat, a clamping hole is disposed at the other end of the connecting shaft, the connecting shaft can extend into the receiving hole, a first clamping protrusion is disposed in the clamping hole, a second clamping protrusion is disposed at one end of the locking component, and the locking component can pass through the locking hole and extend into the clamping hole;
(Continued)

and when the locking component is rotated to a lockout position, the first clamping protrusion can abut against the second clamping protrusion and restrain the second clamping protrusion from exiting the clamping hole.

10 Claims, 7 Drawing Sheets

(51) Int. Cl.
    *F16B 2/18*     (2006.01)
    *G09F 9/30*     (2006.01)
    *G09F 9/33*     (2006.01)
    *F21Y 115/10*     (2016.01)

(58) Field of Classification Search
    CPC .............. F16B 21/04; G09F 9/30; G09F 9/33; G09F 9/3026; F21Y 2115/10

USPC ................ 248/371, 178.1, 179.1, 357, 177.1
See application file for complete search history.

(56) References Cited

U.S. PATENT DOCUMENTS

2006/0239677 A1* 10/2006 Friedrich ............... F16M 11/08
                                                396/419
2018/0259298 A1* 9/2018 Gao ......................... F16B 2/18
2018/0328082 A1 11/2018 Zhang et al.
2019/0162362 A1* 5/2019 Chen ..................... F16M 11/041

FOREIGN PATENT DOCUMENTS

| CN | 207701538 U | 8/2018 |
|---|---|---|
| CN | 207718734 U | 8/2018 |
| WO | 2017215190 A1 | 12/2017 |

* cited by examiner

PIN-TYPE CONNECTION APPARATUS

TECHNICAL FIELD

The present application relates to the field of connection apparatus technologies, and more specifically, to a pin-type connection apparatus.

BACKGROUND

LED displays have become more and more widely and frequently used in daily life. An LED display includes a box and a PCB board that is fastened to the box. Because LED displays are relatively large in size, in actual use, relatively small LED displays are usually spliced to form a relatively large display that meets a use requirement.

During transportation or splicing of the boxes, a lifting beam is usually used to lift the boxes. Lifting beams also need to be spliced during splicing of boxes in many cases, so that the length of the lifting beams is the same as the length of the box, facilitating boxes fastening or lifting. However, existing lifting beam splicing is very inconvenient and inefficient.

SUMMARY

An objective of the present application is to provide a pin-type connection apparatus, to resolve a prior-art technical problem of inconvenient splicing.

To achieve the foregoing objective, technical solutions used in the present application are as follows: A pin-type connection apparatus is provided, wherein the pin-type connection apparatus includes a first connecting seat, a second connecting seat, a connecting shaft, and a locking component, a receiving hole and a locking hole on the adjacent side of the receiving hole are disposed on the second connecting seat, one end of the connecting shaft is fastened to the first connecting seat, and a clamping hole is disposed at the other end of the connecting shaft, the connecting shaft can extend into the receiving hole, a first clamping protrusion is disposed in the clamping hole, a second clamping protrusion is disposed at one end of the locking component, and the locking component can pass through the locking hole and extend into the clamping hole;

when the locking component is rotated to a lockout position, the first clamping protrusion can abut against the second clamping protrusion and restrain the second clamping protrusion from exiting the clamping hole; and when the locking component is rotated to an unlock position, the second clamping protrusion can exit the clamping hole.

Further, the pin-type connection apparatus further includes a positioning part, wherein the positioning part is disposed on the first connecting seat, a positioning hole is disposed on the second connecting seat, and the positioning part can extend into the positioning hole.

Further, the locking component includes a fastening block and a rotation shaft, the second clamping protrusion is disposed at one end of the rotation shaft, the fastening block is fixed on one side of the first connecting seat provided with a locking hole, a through hole is disposed on the fastening block, and the rotation shaft passes through the through hole and is movably connected to the fastening block.

Further, the pin-type connection apparatus further includes a first stop member and a second stop member, where the rotation shaft includes a locking shaft and a shaft sleeve, the second clamping protrusion is disposed at one end of the locking shaft, and the shaft sleeve is sleeved on the locking shaft and passes through the through hole;

the first stop member is disposed on the fastening block, and can limit the rotation of the shaft sleeve; and the second stop member is disposed on the shaft sleeve, and can restrain the locking shaft from moving relative to the shaft sleeve in the axial direction of the locking shaft.

Further, a first stop groove is disposed on the shaft sleeve, the first stop groove extends in the axial direction of the shaft sleeve, and the first stop member can extend into the first stop groove; and a second stop groove is disposed on the locking shaft, the second stop groove extends in the circumferential direction of the locking shaft, and the second stop member can extend into the second stop groove.

Further, the shaft sleeve includes an extending part and an abutting part, and the diameter of the through hole is greater than the diameter of the extending part and less than the diameter of the abutting part;

when the locking component is in the lockout position, a sidewall of the abutting part abuts against the fastening block.

Further, the locking component further includes a handle, and the handle is fastened to an end of the locking shaft away from the second clamping protrusion.

Further, the locking component further includes a lockout part, the lockout part is disposed on the handle, and the lockout part can lock the locking shaft on the fastening block.

Further, the lockout part includes an elastic part and a button, the button is rotatably connected to the handle, one end of the elastic part can be fixedly connected to the fastening block, and the other end is fixedly connected to the button, when the button abuts against the locking shaft, the elastic part locks the locking shaft on the second connecting seat; and when the button is detached from the locking shaft, the locking shaft can rotate relative to the fastening block.

Further, the button and the locking shaft are both provided with teeth, and the teeth of the button can mesh with the teeth of the locking shaft.

The pin-type connection apparatus provided in the present application brings the following beneficial effects: According to the pin-type connection apparatus in the present application, after the connecting shaft is aligned with the receiving hole, the connecting shaft is pushed into the receiving hole, and then the locking component is pushed, so that the locking component extends into the clamping hole. Then the locking component is rotated, so that the first clamping protrusion abuts against the second clamping protrusion. In this case, the first clamping protrusion limits the axial direction of the locking component, to prevent the second clamping protrusion from exiting the clamping hole, so that the locking component locks the connecting shaft in the receiving hole, and the connecting shaft connects the first connecting seat and the second connecting seat together. In comparison with the prior art, the pin-type connection apparatus has a simple structure and is easy to operate. The first connecting seat and the second connecting seat can be connected together merely by manually pushing the first connecting seat, the locking component, and rotating the locking component. Therefore, connection efficiency is high.

BRIEF DESCRIPTION OF DRAWINGS

To describe the technical solutions in the embodiments of the present application more clearly, the following briefly describes the accompanying drawings required for describing the embodiments or the prior art. Apparently, the accompanying drawings in the following description show merely some embodiments of the present application, and a person of ordinary skill in the art may still derive other drawings from these accompanying drawings without creative efforts.

Reference numerals in the figures are as follows:
1: First connecting seat; 11: First base; 12: First cover plate; 121: Positioning part; 122: Fastening hole; 123: First mounting hole;
2: Second connecting seat; 21: Second base; 211: Receiving hole; 212: Locking hole; 22: Second cover plate; 221: Positioning hole; 222: Shaft hole;
3: Connecting shaft; 31: Clamping hole; 32: First clamping protrusion; 33: Fastening shaft; 34: Second mounting hole;
4: Locking component; 41: Second clamping protrusion; 42: Fastening block; 421: Through hole; 43: Rotation shaft; 431: Shaft sleeve; 4311: Extending part; 4312: Abutting part; 432: Locking shaft; 44: Handle; 45: Lockout part; 451: Elastic part; 452: Button;
5: First stop member; and
6: Second stop member.

DESCRIPTION OF EMBODIMENTS

In order to make the technical problems to be solved in the present application, technical solutions and beneficial effects clearer, the following describes the present application in further detail with reference to the accompanying drawings and embodiments. It should be understood that the specific embodiments described herein are merely intended to explain the application and are not intended to limit the application.

It should be noted that when an element is referred to as "fixed" "fastened" or "disposed" on another element, it can be disposed on the other element directly or indirectly. When the element is referred to as "connected to" another element, it may be connected to the other element directly or indirectly.

It should be understood that the terms "length", "width", "upper", "lower", "front", "back", "left", "right", "vertical", "horizontal", "top", "bottom", "inside", "outside" indicate directions or position relationships based on the accompanying drawings, and are merely intended to facilitate the description and simplification of the present application, and are not intended to indicate or imply that the device or element must have specific directions and be constructed and operated with specific directions, which are not to be understood as limitations of the present application.

In addition, the terms "first" and "second" are used for descriptive purposes only and cannot be understood to indicate or imply relative importance or implicitly indicate the number of technical features indicated. Thus, features defined as "first" and "second" may explicitly or implicitly include one or more of such features. In the description of the present application, "a plurality of" means two or more unless otherwise specified.

Further, unless otherwise required by context, singular terms shall include pluralities and plural terms shall include the singular. Thus, as used herein and in the claims, the singular forms include the plural reference and vice versa unless the context clearly indicates otherwise.

Figure 1:
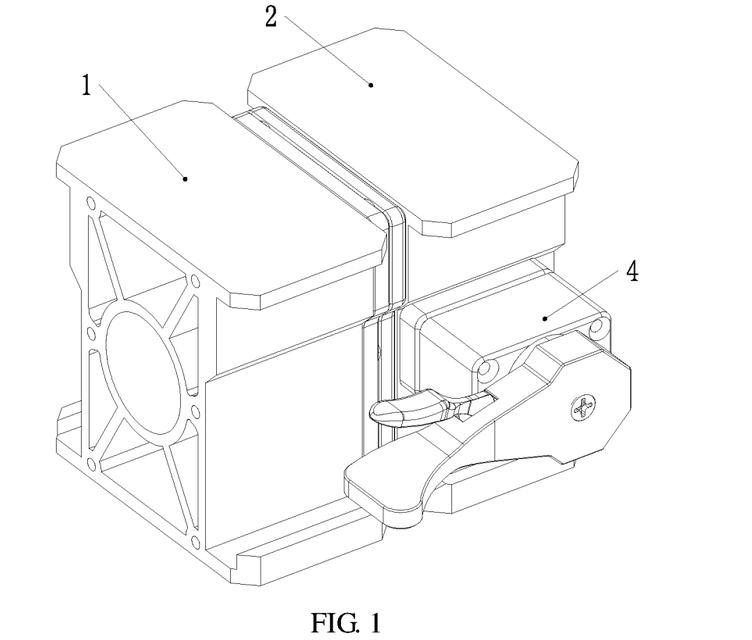
FIG. 1 is a schematic structural diagram of the pin-type connection apparatus according to an embodiment of the present application.
Figure 2:
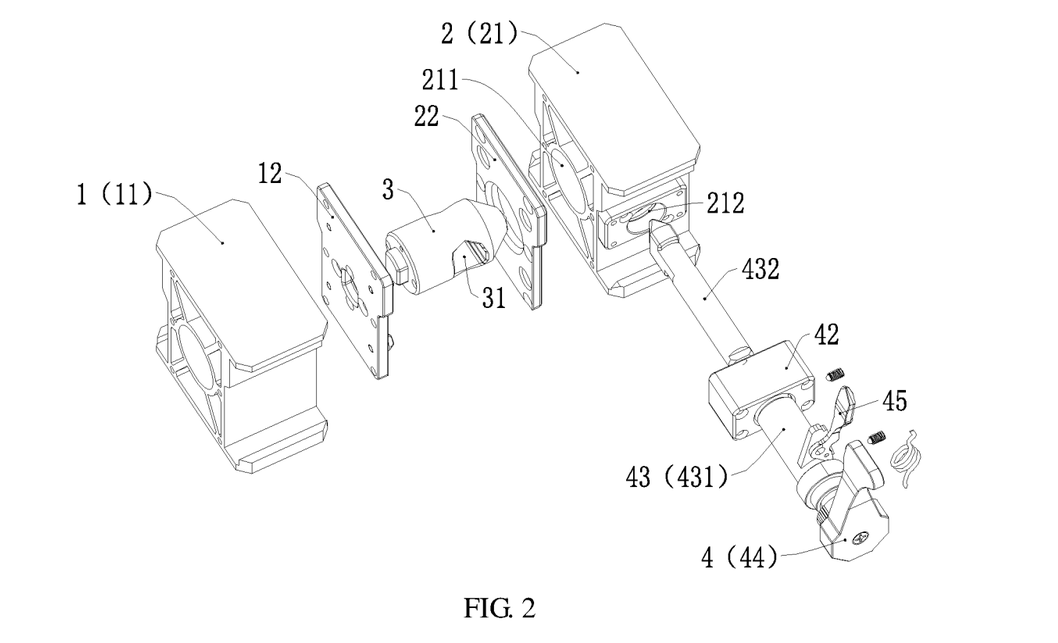
FIG. 2 is an exploded diagram of FIG. 1.
Figure 9:
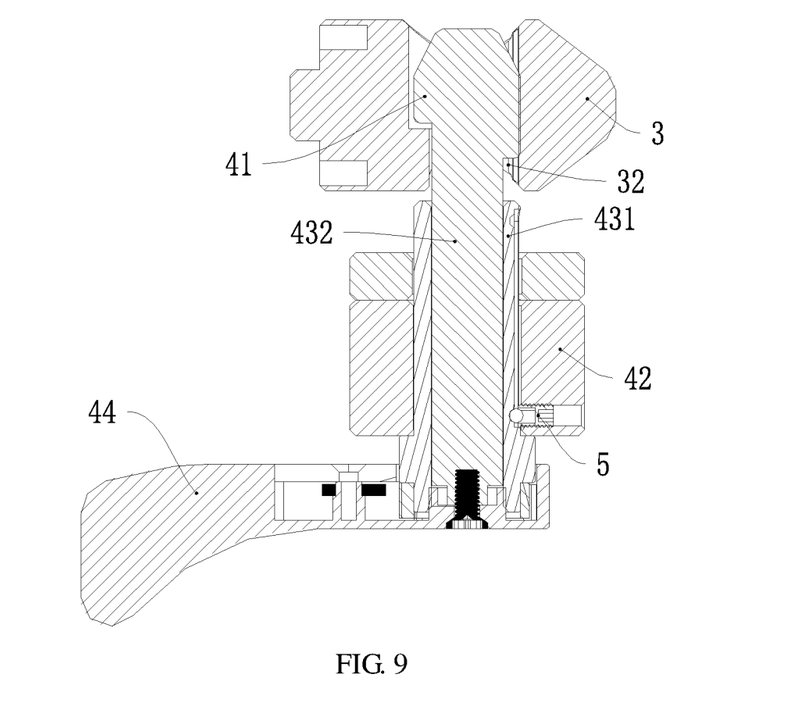
FIG. 9 is a sectional view of an assembling state of the connecting shaft and the locking component in FIG. 2.

Referring to FIG. 1, FIG. 2, and FIG. 9, the pin-type connection apparatus provided in the present application is described. The pin-type connection apparatus includes a first connecting seat 1, a second connecting seat 2, a connecting shaft 3, and a locking component 4, a receiving hole 211 and a locking hole 212 on the adjacent side of the receiving hole 211 are disposed on the second connecting seat 2, one end of the connecting shaft 3 is fastened to the first connecting seat 1, a clamping hole 31 is disposed at the other end of the connecting shaft 3, the connecting shaft 3 can extend into the receiving hole 211, a first clamping protrusion 32 is disposed in the clamping hole 31, a second clamping protrusion 41 is disposed at one end of the locking component 4, and the locking component 4 can pass through the locking hole 212 and extend into the clamping hole 31.

When the locking component 4 is rotated to a lockout position, the first clamping protrusion 32 can abut against the second clamping protrusion 41 and restrain the second clamping protrusion 41 from exiting the clamping hole 31.

When the locking component 4 is rotated to an unlock position, the second clamping protrusion 41 can exit the clamping hole 31.

According to the pin-type connection apparatus provided in the present application, after the connecting shaft 3 is aligned with the receiving hole 211, the connecting shaft 3 is pushed into the receiving hole 211, and then the locking component 4 is pushed, so that the locking component 4 extends into the clamping hole 31. Then the locking component 4 is rotated, so that the first clamping protrusion 32 abuts against the second clamping protrusion 41. In this case, the first clamping protrusion 32 limits the axial direction of the locking component 4, to prevent the second clamping protrusion 41 from exiting the clamping hole 31, so that the locking component 4 locks the connecting shaft 3 in the receiving hole 211, and the connecting shaft 3 connects the first connecting seat 1 and the second connecting seat 2 together. In comparison with the prior art, the pin-type connection apparatus has a simple structure and is easy to operate. The first connecting seat 1 and the second connecting seat 2 can be connected together merely by manually pushing the first connecting seat 1, the locking component 4, and rotting the locking component 4. Therefore, connection efficiency is high.

Preferably, the clamping hole 31 is disposed in the radial direction of the connecting shaft 3.

Specifically, referring to FIG. 9, the first clamping protrusion 32 is disposed on a sidewall at one end of the clamping hole 31, and is located at an end of the clamping hole 31 close to the locking component 4.

More specifically, two first clamping protrusions 32 are disposed at an end of the clamping hole 31 into which the locking component 4 extends, and are respectively staggered on the side wall of the clamping hole 31 along the circumferential direction.

Specifically, referring to FIG. 9, second clamping protrusions 41 are in a one-to-one correspondence with first clamping protrusions 32. If the first clamping protrusions 32 are two, the second clamping protrusions 41 are also two, which are respectively staggered on the outer circumference of the locking component 4. When the second clamping protrusion 41 extends into the clamping hole 31, the second clamping protrusion 41 can pass through the place in which no first clamping protrusion 32 is disposed on the sidewall of the clamping hole 31. After the locking component 4 is rotated, the second clamping protrusion 41 abuts against the first clamping protrusion 32.

Specifically, referring to FIG. 9, the second clamping protrusion 41 has a shape of an inverted cone.

In actual use, the first connecting seat 1 and the second connecting seat 2 may serve as lifting beams, or the first connecting seat 1 and the second connecting seat 2 may be respectively fastened on two ends of a lifting beam, thereby facilitating splicing.

Figure 3:
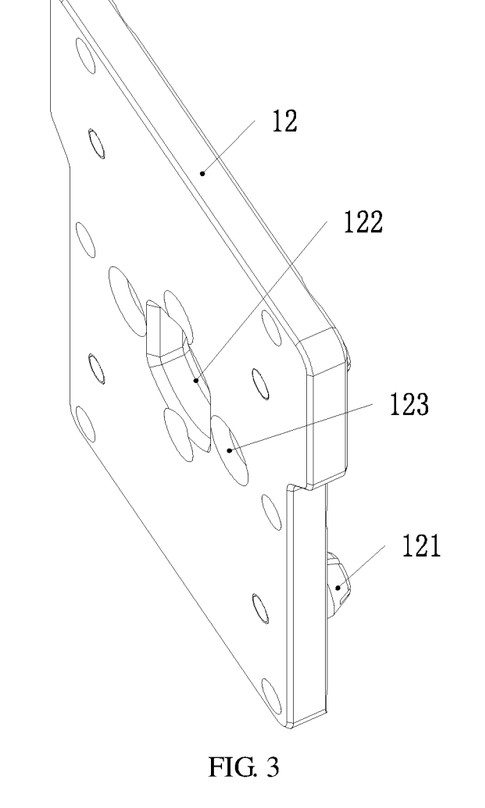
FIG. 3 is a structural diagram of the first cover plate in FIG. 2.
Figure 4:
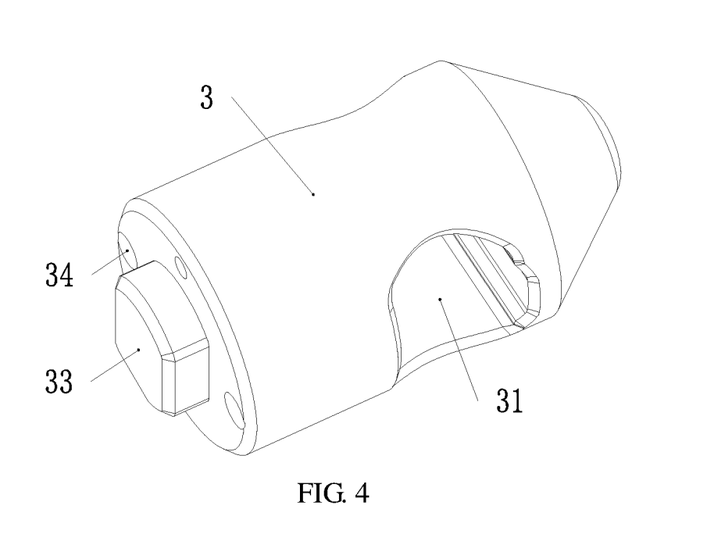
FIG. 4 is a structural diagram of the connecting shaft in FIG. 2.

Further, referring to FIG. 2 to FIG. 4, in a specific implementation of the pin-type connection apparatus provided in the present application, the pin-type connection apparatus further includes a connecting part, the first connecting seat 1 includes a first base 11 and a first cover plate 12, the first cover plate 12 is fastened to the first base 11, a fastening hole 122 and a first mounting hole 123 are disposed on the first cover plate 12, a fastening shaft 33 and a second mounting hole 34 are disposed on the connecting shaft 3, the fastening shaft 33 is buckled in the fastening hole 122, and the connecting part passes through the first mounting hole 123 and the second mounting hole 34, and fastens the connecting shaft 3 to the first cover plate 12. The fastening shaft 33 is buckled by using the fastening hole 122, so that the connecting shaft 3 is prevented from rotating. The connection structure is simple and easy to operate and implement.

Specifically, the first cover plate 12 is fastened to the first base 11 by using a screw.

Specifically, the connecting part is a screw, the fastening hole 122 is a square hole, and the fastening shaft 33 is a square shaft.

Specifically, a plurality of lightening holes are disposed on the first base 11, to reduce a weight of the first base 11.

Further, referring to FIG. 2 to FIG. 5, in a specific implementation of the pin-type connection apparatus provided in the present application, the second connecting seat 2 includes a second base 21 and a second cover plate 22, the second cover plate 22 is fastened to the second base 21, a shaft hole 222 is disposed on the second cover plate 22, the receiving hole 211 and the locking hole 212 are disposed on the second base 21, and the connecting shaft 3 can pass through the shaft hole 222 and extend into the receiving hole 211, facilitating processing of the second base 21 and the second cover plate 22, assembling, and transportation.

Figure 5:
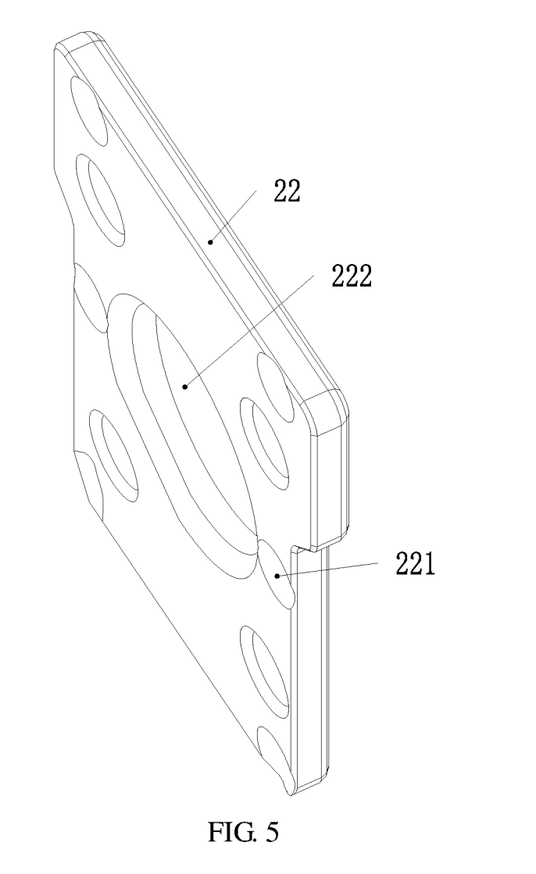
FIG. 5 is a structural diagram of the second cover plate in FIG. 2.

Specifically, the second cover plate 22 is fastened to the second base 21 by using a screw.

Specifically, a plurality of lightening holes are disposed on the second base 21, to reduce a weight of the second base 21.

Further, referring to FIG. 3 and FIG. 5, in a specific implementation of the pin-type connection apparatus provided in the present application, the pin-type connection apparatus further includes a positioning part 121, the positioning part 121 is disposed on the first connecting seat 1, a positioning hole 221 is disposed on the second connecting seat 2, and the positioning part 121 can extend into the positioning hole 221, to avoid a case in which a box cannot be lifted or fastened due to relative rotation of the first connecting seat 1 and the second connecting seat 2 after splicing.

Further, referring to FIG. 3 and FIG. 5, in a specific implementation of the pin-type connection apparatus provided in the present application, the positioning part 121 is disposed on the first cover plate 12, and the positioning hole 221 is disposed on the second cover plate 22, facilitating processing and assembling.

Figure 8:
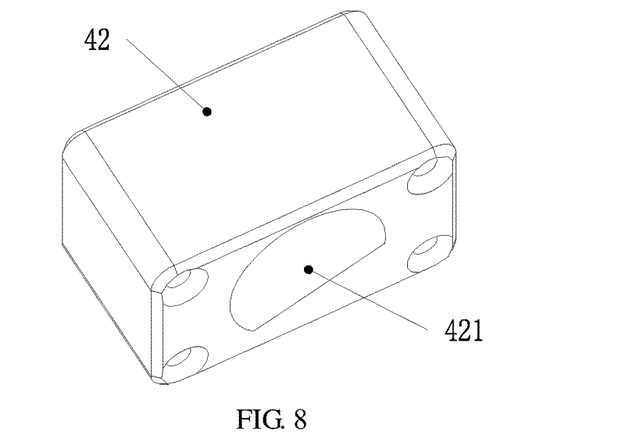
FIG. 8 is a structural diagram of the fastening block in FIG. 2.

Further, referring to FIG. 2, FIG. 8, and FIG. 9, in a specific implementation of the pin-type connection apparatus provided in the present application, the locking component 4 includes a fastening block 42 and a rotation shaft 43, the second clamping protrusion 41 is disposed at one end of the rotation shaft 43, the fastening block 42 is fixed on one side of the first connecting seat 1 provided with the locking hole 212, a through hole 421 is disposed on the fastening block 42, and the rotation shaft 43 passes through the through hole 421 and is movably connected to the fastening block 42, so that the rotation shaft 43 is connected to the fastening block 42, thereby facilitating rapid assembling, avoiding re-mounting of the rotation shaft 43 during splicing, and improving splicing efficiency.

Specifically, the fastening block 42 is fastened to the second base 21 by using a screw.

Figure 6:
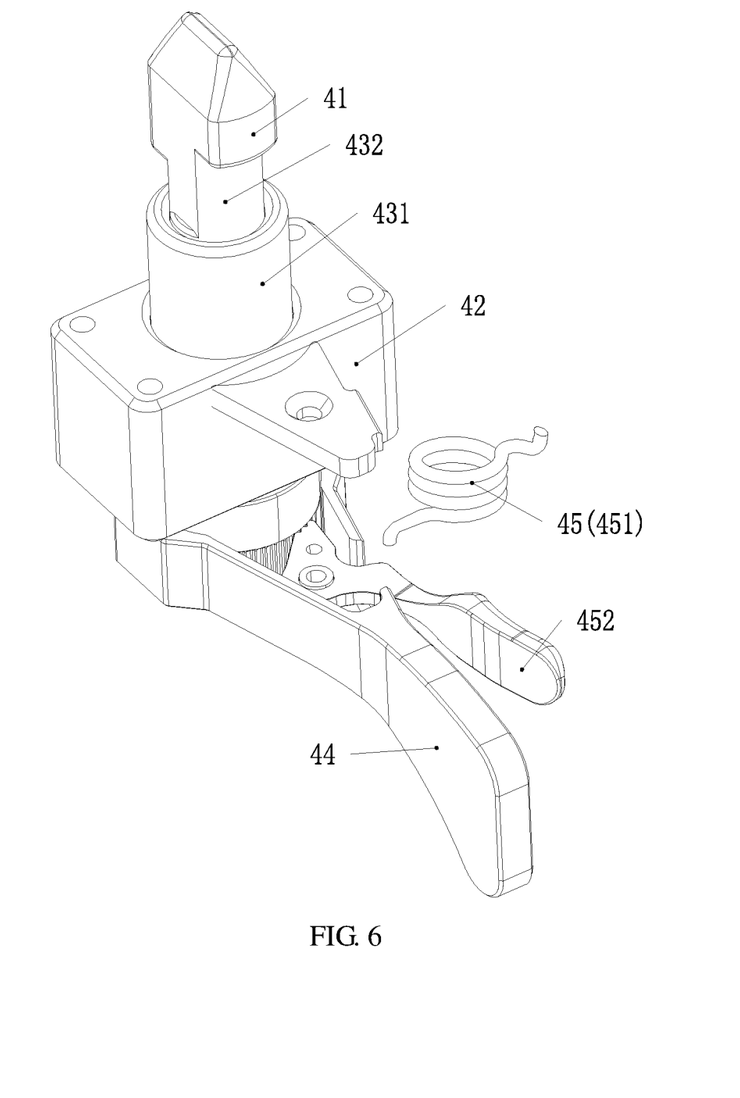
FIG. 6 is a structural diagram of the locking component in FIG. 2.
Figure 7:
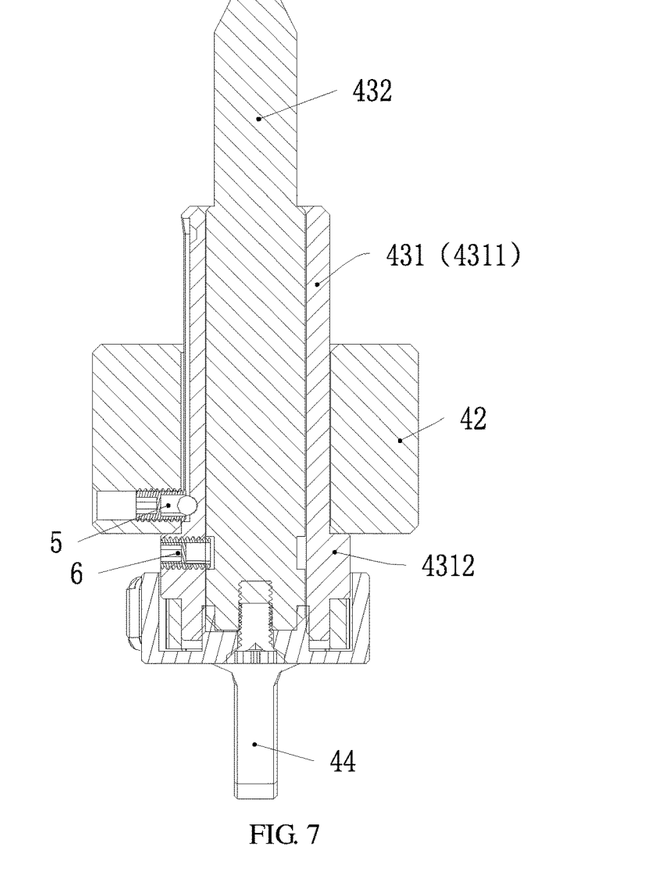
FIG. 7 is a sectional view of the locking component shown in FIG. 6.

Further, referring to FIG. 2, FIG. 6, and FIG. 7, in a specific implementation of the pin-type connection apparatus provided in the present application, the pin-type connection apparatus further includes a first stop member 5 and a second stop member 6, the rotation shaft 43 includes a locking shaft 432 and a shaft sleeve 431, the second clamping protrusion 41 is disposed at one end of the locking shaft 432, and the shaft sleeve 431 is sleeved on the locking shaft 432 and passes through the through hole 421.

The first stop member 5 is disposed on the fastening block 42, and can limit the rotation of the shaft sleeve 431.

The second stop member 6 is disposed on the shaft sleeve 431, and can restrain the locking shaft 432 from moving relative to the shaft sleeve 431 in the axial direction of the locking shaft 432.

The first stop member 5 can restrain the shaft sleeve 431 from rotating relative to the fastening block 42, and the second stop member 6 can restrain the locking shaft 432 from moving relative to the shaft sleeve 431 in the axial direction of the locking shaft 432. In this way, the locking shaft 432 can rotate relative to the fastening block 42, the locking shaft 432 can move relative to the fastening block 42 in the axial direction of the locking shaft 432, and also, the locking shaft 432 can be connected to the fastening block 42. Therefore, the structure is simple and easy to use, and the first clamping protrusion 32 can abut against the second clamping protrusion 41, so that the first connecting seat 1 and the second connecting seat 2 can be rapidly spliced.

Specifically, the first stop member 5 and the second stop member 6 are marbles (for example, M3 marbles).

Further, referring to FIG. 7 and FIG. 9, in a specific implementation of the pin-type connection apparatus provided in the present application, a first stop groove is disposed on the shaft sleeve 431, the first stop groove extends in the axial direction of the shaft sleeve 431, the first stop member 5 can extend into the first stop groove, and a groove wall of the first stop groove limits movement of the first stop member 5, so that the first stop member 5 can move only in the axial direction of the shaft sleeve 431, thereby limiting the rotation of the shaft sleeve 431. In this way, the shaft sleeve 431 can move relative to the fastening block 42 only in the axial direction of the shaft sleeve 431, and the shaft sleeve 431 can be further restrained from exiting the through hole 421.

A second stop groove is disposed on the locking shaft 432, the second stop groove extends in the circumferential direction of the locking shaft 432, the second stop member 6 can extend into the second stop groove, and a groove wall of the second stop groove limits movement of the second stop member 6, so that the second stop member 6 can move only in the circumferential direction of the second stop member 6. In this way, the locking shaft 432 can move relative to the shaft sleeve 431 only in the axial direction of the locking shaft 432, so that the locking shaft 432 can only rotate, and further, the locking shaft 432 can be restrained from being detached from the shaft sleeve 431. Therefore, based on a joint position limiting function of the first stop member 5 and the second stop member 6, the locking shaft 432 can be rotatably connected to the fastening block 42 relative to the fastening block 42, facilitating rapid assembling.

Further, referring to FIG. 7, in a specific implementation of the pin-type connection apparatus provided in the present application, the shaft sleeve 431 includes an extending part 4311 and an abutting part 4312, and the diameter of the through hole 421 is greater than the diameter of the extending part 4311 and less than the diameter of the abutting part 4312.

When the locking component 4 is in the lockout position, a sidewall of the abutting part 4312 abuts against the fastening block 42, so that the second clamping protrusion 41 can be pushed into the clamping hole 31 to abut against the first clamping protrusion 32. When the second clamping protrusion 41 completely enters the clamping hole 31, the abutting part 4312 abuts against the fastening block 42, to restrain the second clamping protrusion 41 from further extending. Therefore, when pushing the locking assembly 4, a relatively large force can be used to push the locking component 4 without a need to consider a case in which the second clamping protrusion 41 does not fully extend into the clamping hole 31, and the locking component 4 can be pushed without touching hands, thereby avoiding the occurrence of finger pinching.

Further, referring to FIG. 2 and FIG. 6, in a specific implementation of the pin-type connection apparatus provided in the present application, the locking component 4 further includes a handle 44, and the handle 44 is fastened to an end of the locking shaft 432 away from the second clamping protrusion 41, facilitating manual rotation of the locking shaft 432, and avoiding discomfort caused by directly manually rotating the locking shaft 432.

Specifically, the handle 44 is fastened to the end of the locking shaft 432 away from the second clamping protrusion 41.

Specifically, the handle 44 is sleeved at an end of the shaft sleeve 431 away from the second clamping protrusion 41.

Further, referring to FIG. 2 and FIG. 6, in a specific implementation of the pin-type connection apparatus provided in the present application, the locking component 4 further includes a lockout part 45, the lockout part 45 is disposed on the handle 44, and the lockout part 45 can lock the locking shaft 432 on the fastening block 42. After the locking shaft 432 is rotated so that the first clamping protrusion 32 abuts against the second clamping protrusion 41 and the connecting shaft 3 is locked in the receiving hole 211, the lockout part 45 locks the locking shaft 432 on the fastening block 42, avoiding a case in which the second clamping protrusion 41 exits the clamping hole 31 due to further rotation of the locking shaft 432.

Further, referring to FIG. 6, in a specific implementation of the pin-type connection apparatus provided in the present application, the lockout part 45 includes an elastic part 451 and a button 452, the button 452 is rotatably connected to the handle 44, one end of the elastic part 451 can be fixedly connected to the fastening block 42, and the other end is fixedly connected to the button 452.

When the button 452 abuts against the locking shaft 432, the elastic part 451 locks the locking shaft 432 on the second connecting seat 2.

When the button 452 is detached from the locking shaft 432, the locking shaft 432 can rotate relative to the fastening block 42. Therefore, the structure is simple and easy to operate, and rapid lockout can be implemented, so that the locking shaft 432 is stationary relative to the fastening block 42.

Further, referring to FIG. 6, in a specific implementation of the pin-type connection apparatus provided in the present application, the button 452 and the locking shaft 432 are both provided with teeth, and the teeth of the button 452 can mesh with the teeth of the locking shaft 432. When the button 452 meshes with the locking shaft 432, in other words, the button 452 abuts against the locking shaft 432, the elastic part 451 is in an unstressed state. The button 452 is rotated, so that the button 452 is detached from the locking shaft 432, and the locking shaft 432 can be rotated. In this case, the elastic part 451 is stressed. When the locking shaft 432 is rotated to the lockout position, the button 452 is released, the button 452 meshes with the locking shaft 432 again, and the elastic part 451 is in the unstressed state again. In this case, the locking shaft 432 is locked on the fastening block 42. It is of relatively high stability to mesh the button 452 with the locking shaft 432 to lock the locking shaft 432 on the fastening block 42.

Specifically, the elastic part 451 is a torsion spring.

Specifically, referring to FIG. 6, an accommodation cavity is disposed on the handle 44, the button 452 is rotatably connected to the accommodation cavity by using a pin shaft, and then a locking cover plate is used to cover the accommodation cavity, so that the button 452 is fastened in the accommodation cavity.

Specifically, a lockout plate is disposed on a fastening plate, so that one end of the torsion spring is fastened to the lockout plate.

Figure 10:
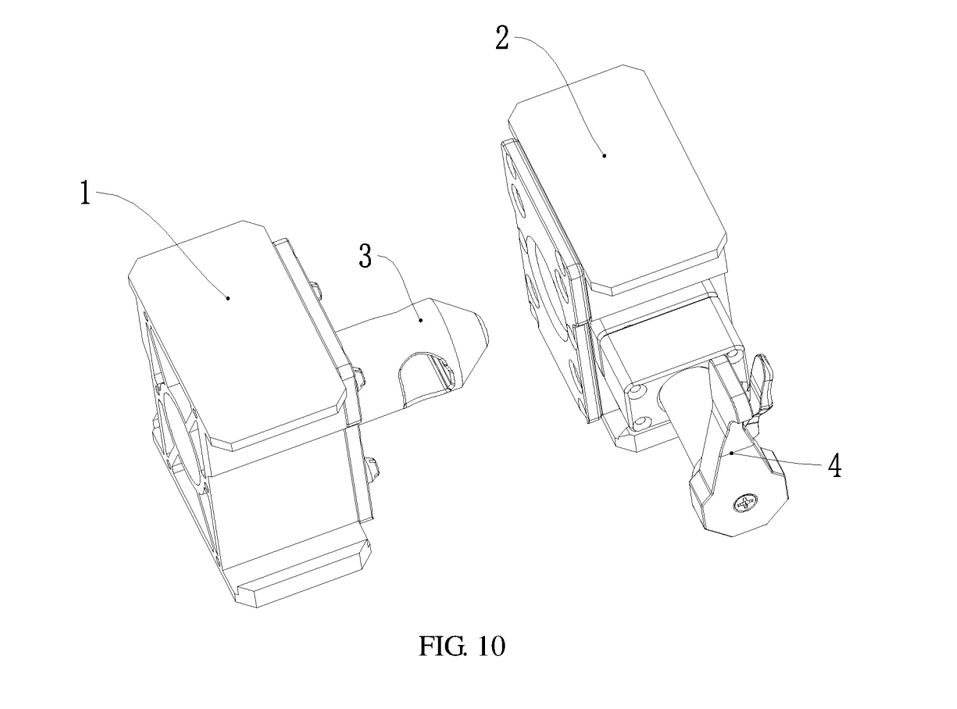
FIG. 10 is a usage state diagram 1 of the pin-type connection apparatus shown in FIG. 1.
Figure 11:
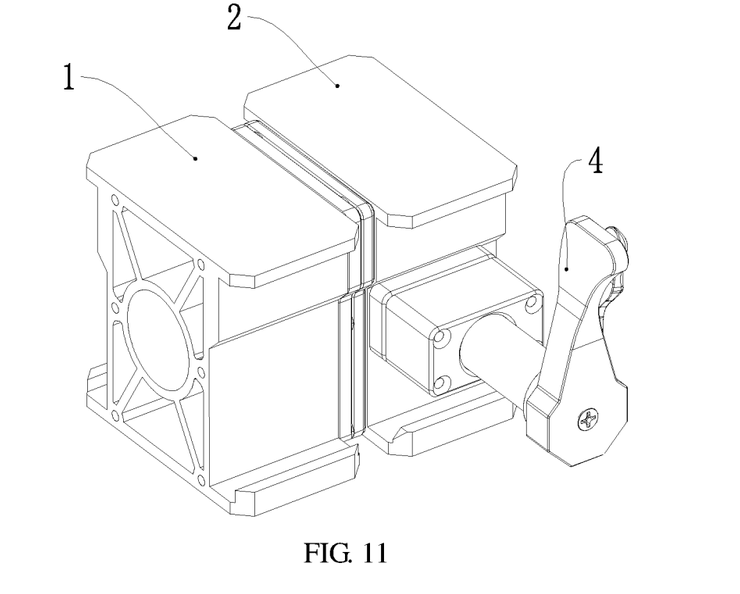
FIG. 11 is a usage state diagram 2 of the pin-type connection apparatus shown in FIG. 1.
Figure 12:
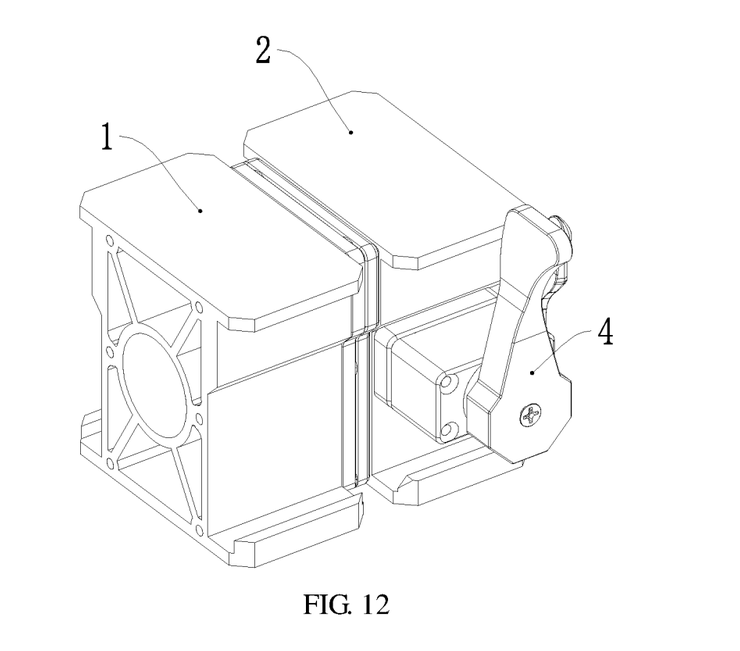
FIG. 12 is a usage state diagram 3 of the pin-type connection apparatus shown in FIG. 1.

A splicing process in a preferred embodiment of the present application is as follows:

The connecting shaft 3 is first aligned with the shaft hole 222 (as shown in FIG. 10 and FIG. 5), and then the first connecting seat 1 is pushed to approach the second connecting seat 2, so that the connecting shaft 3 extends into the receiving hole 211 (as shown in FIG. 2 and FIG. 11). Then the handle 44 is pushed, so that the second clamping protrusion 41 approaches the first clamping protrusion 32 until the second clamping protrusion 41 extends into the clamping hole 31 (as shown in FIG. 2 and FIG. 12). Then the button 452 is pressed, and the handle 44 is also rotated until the first clamping protrusion 32 abuts against the second clamping protrusion 41 (as shown in FIG. 9 and FIG. 1). The button 452 is released, so that the first connecting seat 1 and the second connecting seat 2 are connected together (as shown in FIG. 1). Splicing efficiency is high, and the splicing is stable, firm, and easy to operate.

The foregoing descriptions are merely example embodiments of the present application, but are not intended to limit the present application. Any modification, equivalent replacement, improvement, and the like made without departing from the spirit and principle of the present application should fall within the protection scope of the present application.

What is claimed is:

1. A pin connection apparatus, comprising: a first connecting seat and a second connecting seat, and further comprising a connecting shaft and a locking component, wherein a receiving hole and a locking hole on an adjacent side of the receiving hole are disposed on the second connecting seat, one end of the connecting shaft is fastened to the first connecting seat, a clamping hole is disposed at another end of the connecting shaft, the connecting shaft can extend into the receiving hole, a first clamping protrusion is disposed in the clamping hole, a second clamping protrusion is disposed at one end of the locking component, and the locking component can pass through the locking hole and extend into the clamping hole;

when the locking component is rotated to a lockout position, the first clamping protrusion can abut against the second clamping protrusion and restrain the second clamping protrusion from exiting the clamping hole; and when the locking component is rotated to an unlock position, the second clamping protrusion can exit the clamping hole.

2. The pin connection apparatus according to claim 1, further comprising a positioning part, wherein the positioning part is disposed on the first connecting seat, a positioning hole is disposed on the second connecting seat, and the positioning part can extend into the positioning hole.

3. The pin connection apparatus according to claim 1, wherein the locking component comprises a fastening block and a rotation shaft, the second clamping protrusion is disposed at one end of the rotation shaft, the fastening block is fixed on one side of the second connecting seat provided with the locking hole, a through hole is disposed on the fastening block, and the rotation shaft passes through the through hole and is movably connected to the fastening block.

4. The pin connection apparatus according to claim 3, further comprising a first stop member and a second stop member, wherein the rotation shaft comprises a locking shaft and a shaft sleeve, the second clamping protrusion is disposed at one end of the locking shaft, and the shaft sleeve is sleeved on the locking shaft and passes through the through hole;

the first stop member is disposed on the fastening block, and can limit the rotation of the shaft sleeve; and the second stop member is disposed on the shaft sleeve, and can restrain the locking shaft from moving relative to the shaft sleeve in an axial direction of the locking shaft.

5. The pin connection apparatus according to claim 4, wherein a first stop groove is disposed on the shaft sleeve, the first stop groove extends in the axial direction of the shaft sleeve, and the first stop member can extend into the first stop groove; and a second stop groove is disposed on the locking shaft, the second stop groove extends in a circumferential direction of the locking shaft, and the second stop member can extend into the second stop groove.

6. The pin connection apparatus according to claim 4, wherein the shaft sleeve comprises an extending part and an abutting part, and a diameter of the through hole is greater than a diameter of the extending part and less than a diameter of the abutting part;

when the locking component is in the lockout position, a sidewall of the abutting part abuts against the fastening block.

7. The pin connection apparatus according to claim 4, wherein the locking component further comprises a handle, and the handle is fastened to another end of the locking shaft away from the second clamping protrusion.

8. The pin connection apparatus according to claim 7, wherein the locking component further comprises a lockout part, the lockout part is disposed on the handle, and the lockout part can lock the locking shaft on the fastening block.

9. The pin connection apparatus according to claim 8, wherein the lockout part comprises an elastic part and a button, the button is rotatably connected to the handle, one end of the elastic part can be fixedly connected to the fastening block, and another end is fixedly connected to the button, when the button abuts against the locking shaft, the elastic part locks the locking shaft on the second connecting seat; and when the button is detached from the locking shaft, the locking shaft can rotate relative to the fastening block.

10. The pin connection apparatus according to claim 9, wherein the button and the locking shaft are both provided with teeth, and the teeth of the button can mesh with the teeth of the locking shaft.

* * * * *